United States Patent
Okazaki

(10) Patent No.: US 9,742,998 B2
(45) Date of Patent: Aug. 22, 2017

(54) IMAGING APPARATUS

(71) Applicant: Panasonic Intellectual Property Management Co., Ltd., Osaka (JP)

(72) Inventor: Yoshinori Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 14/852,376

(22) Filed: Sep. 11, 2015

(65) Prior Publication Data

US 2016/0088223 A1 Mar. 24, 2016

(30) Foreign Application Priority Data

Sep. 19, 2014 (JP) ................. 2014-190990

(51) Int. Cl.
| | | |
|---|---|---|
| H04N 5/222 | (2006.01) | |
| H04N 5/225 | (2006.01) | |
| H04N 5/232 | (2006.01) | |

(52) U.S. Cl.
CPC ..... *H04N 5/23241* (2013.01); *H04N 5/23209* (2013.01); *H04N 5/23293* (2013.01)

(58) Field of Classification Search
CPC ............ H01L 29/7869; H04N 1/00307; H04N 5/23241; H04N 5/23245; H04W 88/06; A63F 2300/105; G06K 2009/00738; G06F 1/3265; G06F 1/3287; G06F 11/3062; G06F 11/3419; G01W 1/00
See application file for complete search history.

(56) References Cited

U.S. PATENT DOCUMENTS

| | | | | |
|---|---|---|---|---|
| 7,230,647 | B1 * | 6/2007 | Niikawa ................. | G06F 3/147 348/333.13 |
| 7,509,045 | B2 * | 3/2009 | Yamamoto ......... | H04N 5/23241 348/14.02 |
| 2009/0009633 | A1 * | 1/2009 | Suto ....................... | H04N 9/045 348/241 |
| 2014/0016028 | A1 * | 1/2014 | Sakurai ................. | H04N 5/232 348/372 |
| 2014/0028893 | A1 * | 1/2014 | Jung ................. | H04N 5/23212 348/341 |
| 2015/0213290 | A1 * | 7/2015 | Kim ....................... | G06F 21/84 726/36 |

FOREIGN PATENT DOCUMENTS

| | | |
|---|---|---|
| JP | 2010-166607 | 7/2010 |
| JP | 2012-204875 | 10/2012 |

\* cited by examiner

*Primary Examiner* — Trung Diep
(74) *Attorney, Agent, or Firm* — Wenderoth, Lind & Ponack, L.L.P.

(57) ABSTRACT

An imaging apparatus of the disclosure includes a case, an imaging system that captures an object image and generates image data, a displaying unit that displays the image data, a detection sensor that detects the case having been held by a user, a power supply unit that supplies power to the imaging system, the displaying unit, and the detection sensor, and a power supply operation unit that selects turning on or off of supplying power. When the detection sensor detects the case having been held by the user, the power supply unit supplies power to the imaging system, but not to the displaying unit, which is referred to as a tentative startup state. In this state, when the power supply operation unit is turned on, the power supply unit supplies power to the displaying unit.

7 Claims, 11 Drawing Sheets

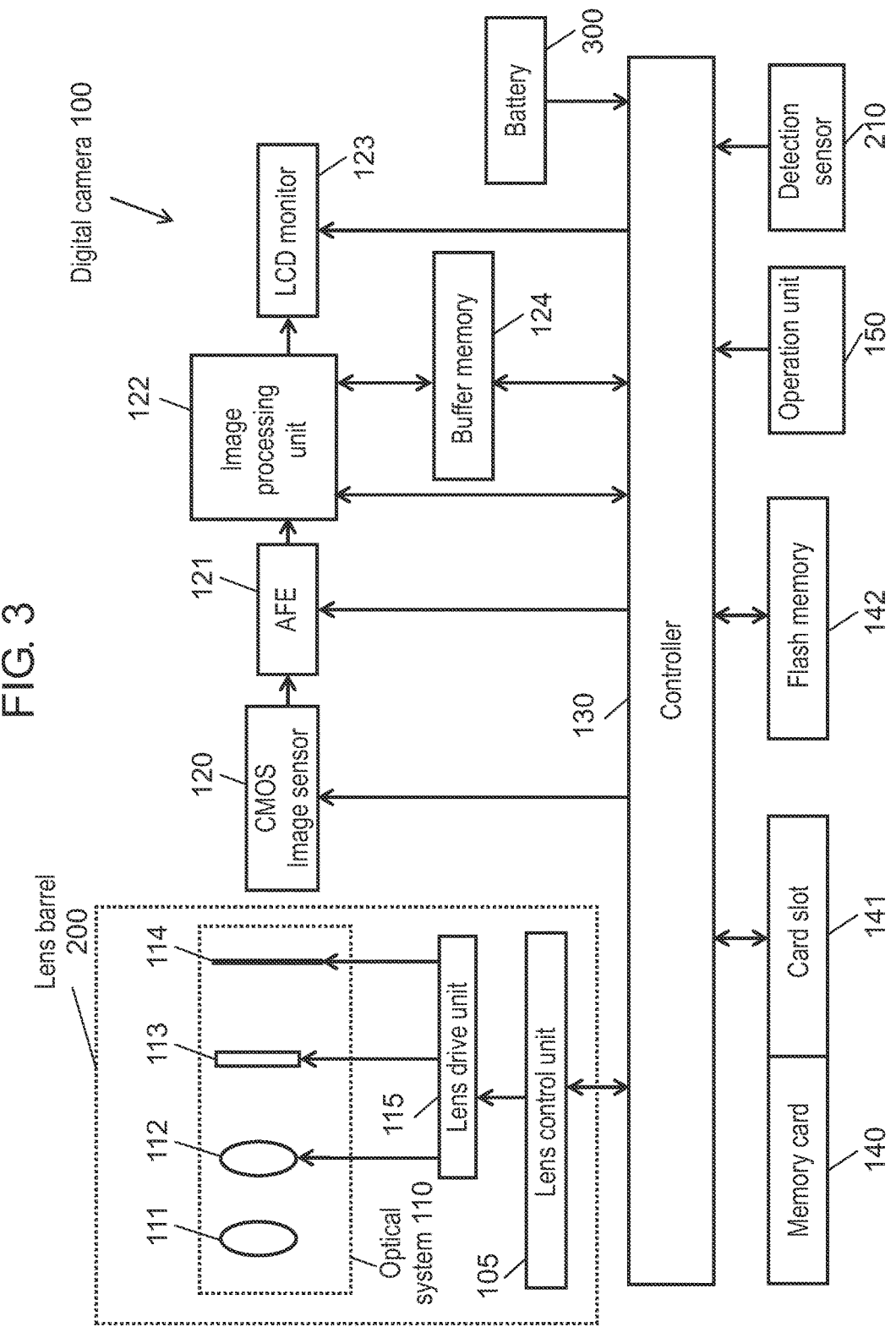

IMAGING APPARATUS

BACKGROUND

1. Technical Field

The present disclosure relates to an imaging apparatus capable of reducing the startup time sensible to the user.

2. Description of the Related Art

Patent literature 1 discloses a camera that detects operation for taking out the camera from a bag for example to allow the state to promptly transition from the power-saving stand-by state to the photographing-ready state.

CITATION LIST

Patent Literature

PTL 1: Unexamined Japanese Patent Publication No. 2012-204875

SUMMARY

An object of the present disclosure is to provide an imaging apparatus that reduces the startup time sensible to a user for higher usability.

An imaging apparatus of the disclosure includes a case, an imaging system that captures an object image and generates image data, a displaying unit that displays the image data, a detection sensor that detects the case having been held by a user, a power supply unit that supplies power to the imaging system, the displaying unit, and the detection sensor, and a power supply operation unit that selects turning on or off of supplying power. When the detection sensor detects the case having been held by the user, the power supply unit supplies power to the imaging system, but not to the displaying unit, which is referred to as a tentative startup state. In this state, when the power supply operation unit is turned on, the power supply unit supplies power to the displaying unit.

The disclosure reduces the startup time sensible to a user, thereby providing an imaging apparatus with higher usability.

BRIEF DESCRIPTION OF DRAWINGS

FIG. 3 is an electrical block diagram of the digital camera.

DETAILED DESCRIPTION

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure and are not intended to limit the subjects described in the claims.

In the following first to third exemplary embodiments, a digital camera is taken as an example of an imaging apparatus for description.

Figure 1:
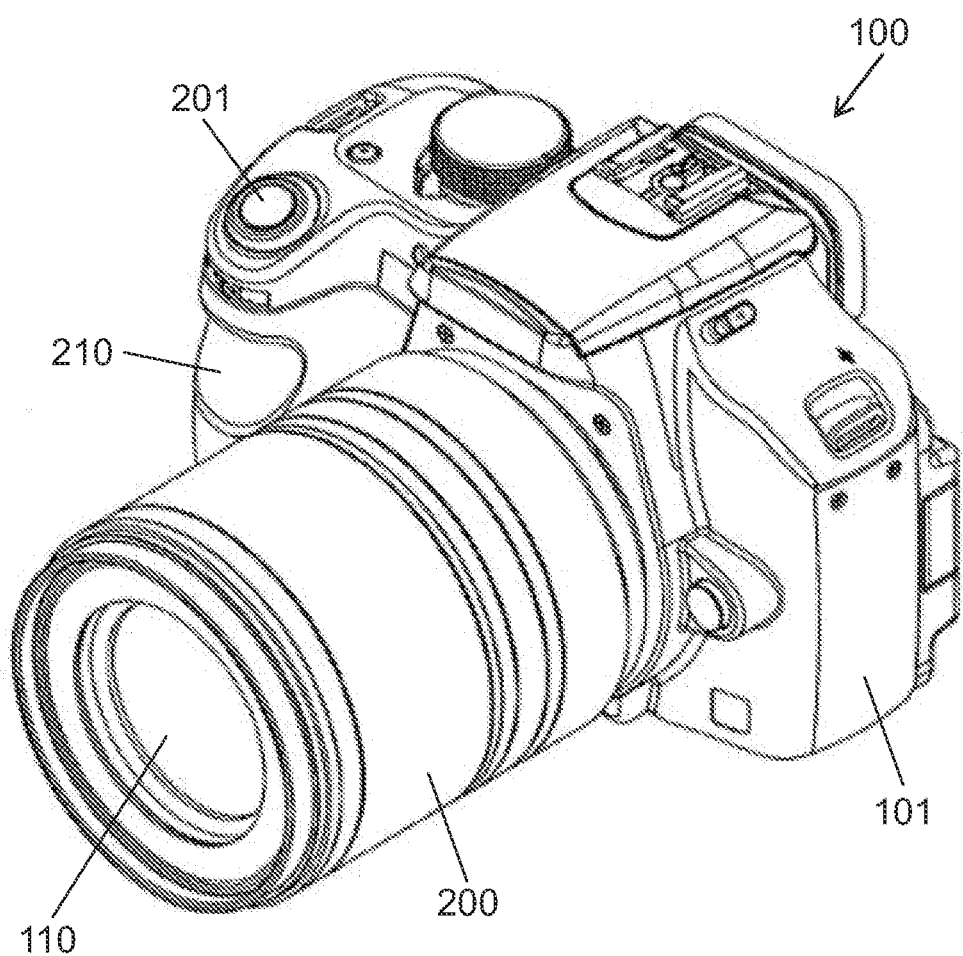
FIG. 1 is a front perspective view of a digital camera according to the first exemplary embodiment.

1. First Exemplary Embodiment 1-1 Configuration 1-1-1 Configuration of the Digital Camera FIG. 1 is a front perspective view of digital camera 100. Digital camera 100 includes case 101, and lens barrel 200 that accommodates optical system 110 at the front of lens barrel 200. Lens barrel 200 is an interchangeable lens detachable from case 101 as a camera body. Digital camera 100 includes operation buttons such as still image release button 201, on the top face. Digital camera 100 further includes pressure-sensitive detection sensor 210 at the grip part.

Figure 2:
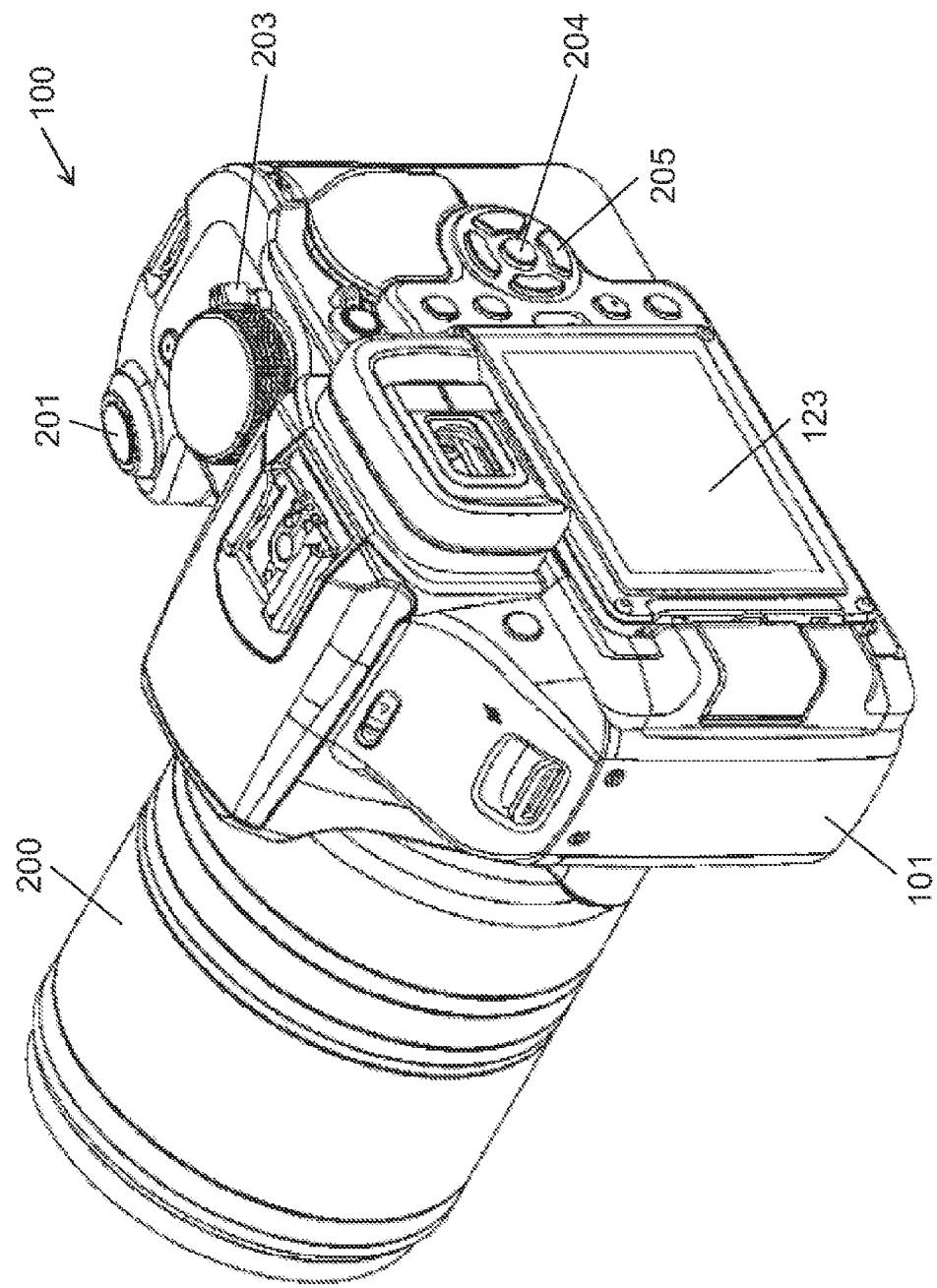
FIG. 2 is a rear perspective view of the digital camera.

FIG. 2 is a rear perspective view of digital camera 100. Digital camera 100 includes power switch 203 on the top face. Power switch 203 is an example of the power supply operation unit. Digital camera 100 further includes LCD monitor 123 on its back face. LCD monitor 123 is an example of the displaying unit. Digital camera 100 further includes operation buttons such as center button 204 and cross-shaped button 205, on its back face.

FIG. 3 is an electrical block diagram of digital camera 100. Digital camera 100 captures an object image formed through optical system 110 using CMOS image sensor 120 as an imaging element.

CMOS image sensor 120 captures an object image formed on the imaging area to generate image data based on the object image. The image data generated through the imaging undergoes various types of processes by AFE (analog front end) 121 and image processing unit 122. The generated image data is recorded in a recording medium such as flash memory 142 and memory card 140. (In this embodiment, memory card 140 is representatively used for description.) The image data recorded in memory card 140 is displayed on LCD monitor 123 or a viewfinder on accepting operation of operation unit 150 by the user.

Lens barrel 200 includes lens control unit 105, optical system 110, and lens drive unit 115. Lens control unit 105 controls lens barrel 200 according to instructions from controller 130 provided in digital camera 100. Optical system 110 is composed of at least one lens. In this embodiment, optical system 110 includes object lens 111, zoom lens 112, focus lens 113, and iris 114. Lens drive unit 115 drives zoom lens 112, focus lens 113, and iris 114, for example, according to instructions from lens control unit 105.

Controller 130 totally controls operation of digital camera 100. Controller 130 may be configured of a hard-wired electronic circuit, a microprocessor for example, or a single semiconductor chip together with image processing unit 122 for example.

Buffer memory 124 is a storing means that functions as a working memory of image processing unit 122 and controller 130. Buffer memory 124 can be implemented by a DRAM (dynamic random access memory) for example. Flash memory 142 functions as an internal memory for recording image data, setup information of digital camera 100, and programs for example that controller 130 executes.

Card slot 141 is a connecting means that allows memory card 140 to be connected removably. Card slot 141 allows memory card 140 to be connected electrically and mechanically. Card slot 141 may have a function of controlling memory card 140.

Memory card 140 is an external memory including a recording unit inside such as a flash memory. Memory card 140 is capable of recording data such as image data processed by image processing unit 122.

Operation unit 150 is a generic name for operation buttons and operation dials equipped as external components of digital camera 100, and accepts operation by the user. Examples of such components include still image release button 201, power switch 203, center button 204, and cross-shaped button 205, shown in FIGS. 1 and 2. Operation unit 150, when accepting operation by the user, sends various types of operation instruction signals to controller 130.

Still image release button 201 is a two-level (i.e., half-push and full-push) push-down button. When still image release button 201 is half-pushed by the user, controller 130 executes AF (auto focus) control and AE (auto exposure) control to determine conditions for photographing. Subsequently, when still image release button 201 is full-pushed by the user, controller 130 performs a photographing process. Controller 130 records image data imaged at a timing of full-push as a still image in memory card 140 for example.

Power switch 203 is a switch for the user to direct supplying power to the components composing digital camera 100.

Center button 204 is a push-down button. When center button 204 is pushed down by the user while digital camera 100 is in the photographing state or playback state, controller 130 displays a menu screen on LCD monitor 123. The menu screen is used to set various types of conditions for photographing and playback. Information set in the menu screen is recorded in flash memory 142. When center button 204 is pushed down with a setup condition item selected, the button functions as an enter button.

Cross-shaped button 205 is a push-down button provided lengthwise and crosswise. The user pushes down either one of the directions of cross-shaped button 205 to select a condition item displayed on LCD monitor 123.

Detection sensor 210 is a pressure-sensitive sensor mounted on the grip part of digital camera 100. Detection sensor 210 detects that the user has grasped the grip part of digital camera 100. Detection sensor 210 can be implemented by a piezoelectric element or an electrostatic sensor, a button, and other parts.

Battery 300 supplies power to digital camera 100. Battery 300 can be inserted into and extracted from digital camera 100. When battery 300 is inserted, controller 130 controls supplying power to each component. Battery 300 is an example of the power supply unit.

1-2 Operation 1-2-1 Startup Operation of an Existing Digital Camera

Figure 4A:
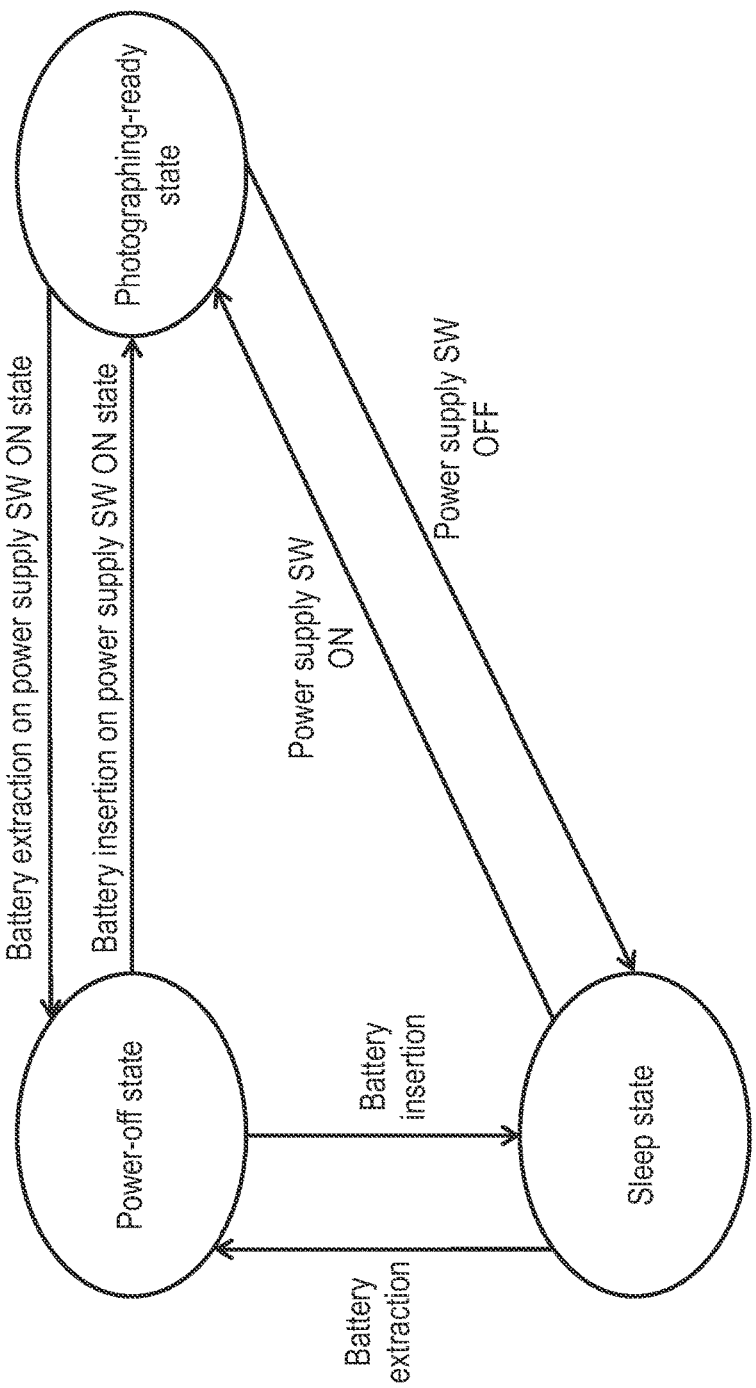
FIG. 4A illustrates state transition of an existing digital camera.
Figure 4B:
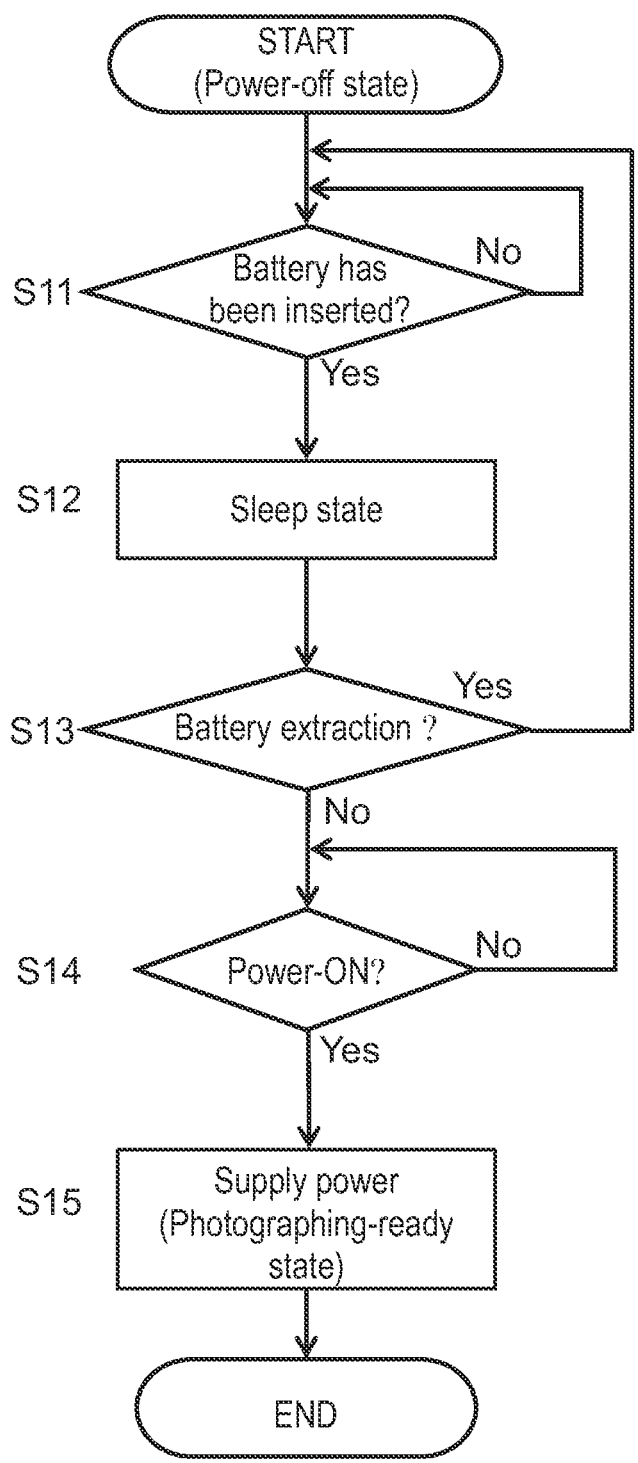
FIG. 4B is a flowchart of the process at startup of the existing digital camera.

A description is made of the startup operation of an existing digital camera using FIGS. 4A and 4B. FIG. 4A illustrates state transition at startup of the existing digital camera. The existing digital camera has three states at power startup: a power-off state, sleep state, and photographing-ready state.

The power-off state is a state in which the battery has been removed from the digital camera and thus power is not being supplied to all the electrical components. The sleep state is a state in which the battery has been inserted into the digital camera and power is being supplied only to the buffer memory. When the battery is inserted into the digital camera, the camera loads programs executed by the controller from the flash memory to the buffer memory. Then, the camera in the sleep state supplies power only to the buffer memory, not to the other electrical components. The photographing-ready state is a state in which power is being supplied to electrical components required for photographing by the existing digital camera and thus the camera is ready for photographing.

FIG. 4B is a flowchart of the process at startup of the existing digital camera. When the camera detects that the battery has been inserted in the power-off state (Yes in step S11), the camera loads programs executed by the controller from the flash memory to the buffer memory and transitions to the sleep state (step S12). When the camera detects that a battery extraction (step S13), the process returns to step S11 to monitor a battery insertion. Next, when the existing digital camera detects a power-on (Yes in step S14), the camera supplies power to electrical components required for photographing and thus the camera is ready for photographing (step S15).

1-2-2 Startup Operation of a Digital Camera in the First Exemplary Embodiment

Figure 5A:
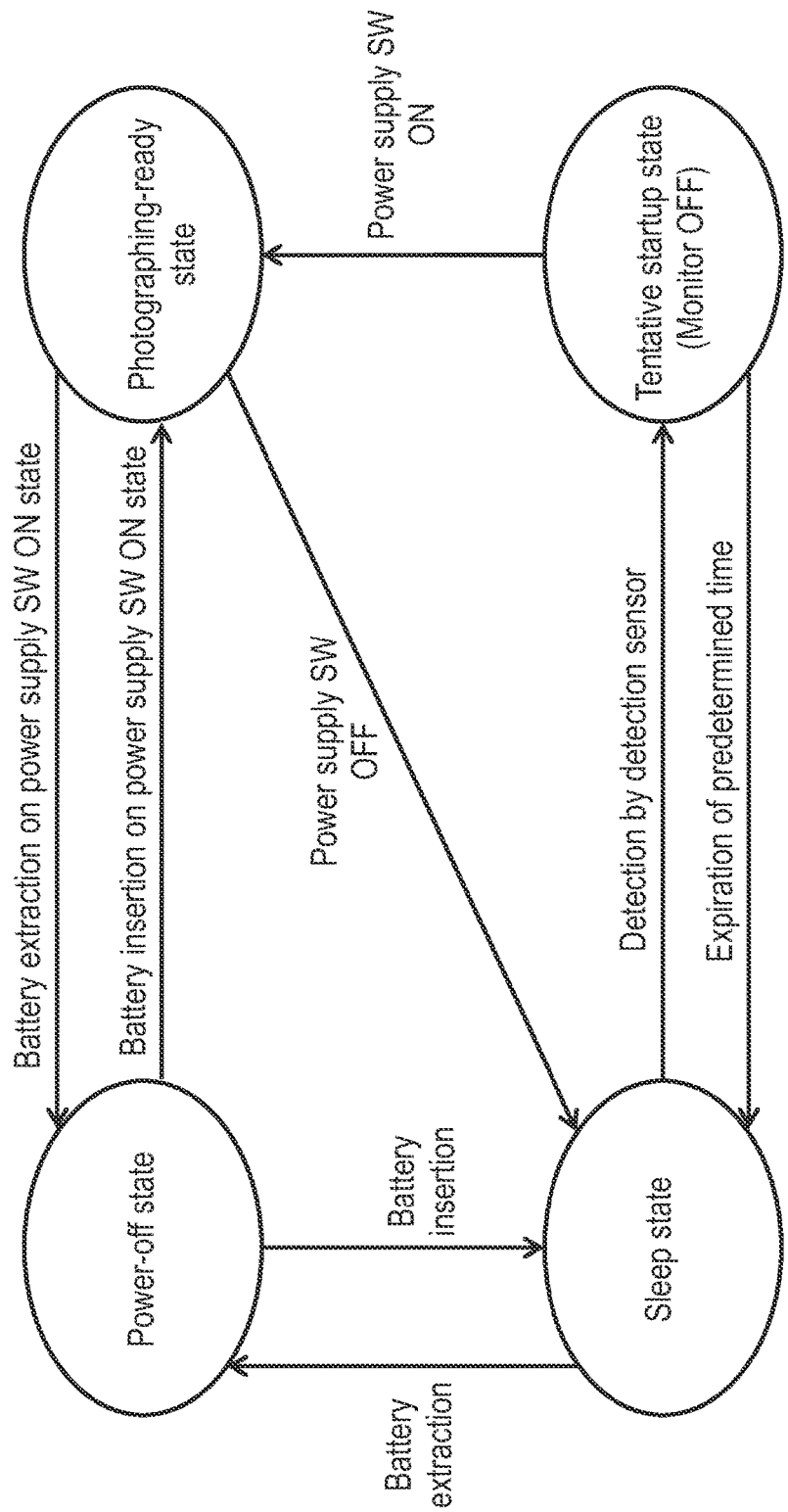
FIG. 5A illustrates state transition of the digital camera of the first embodiment.
Figure 5B:
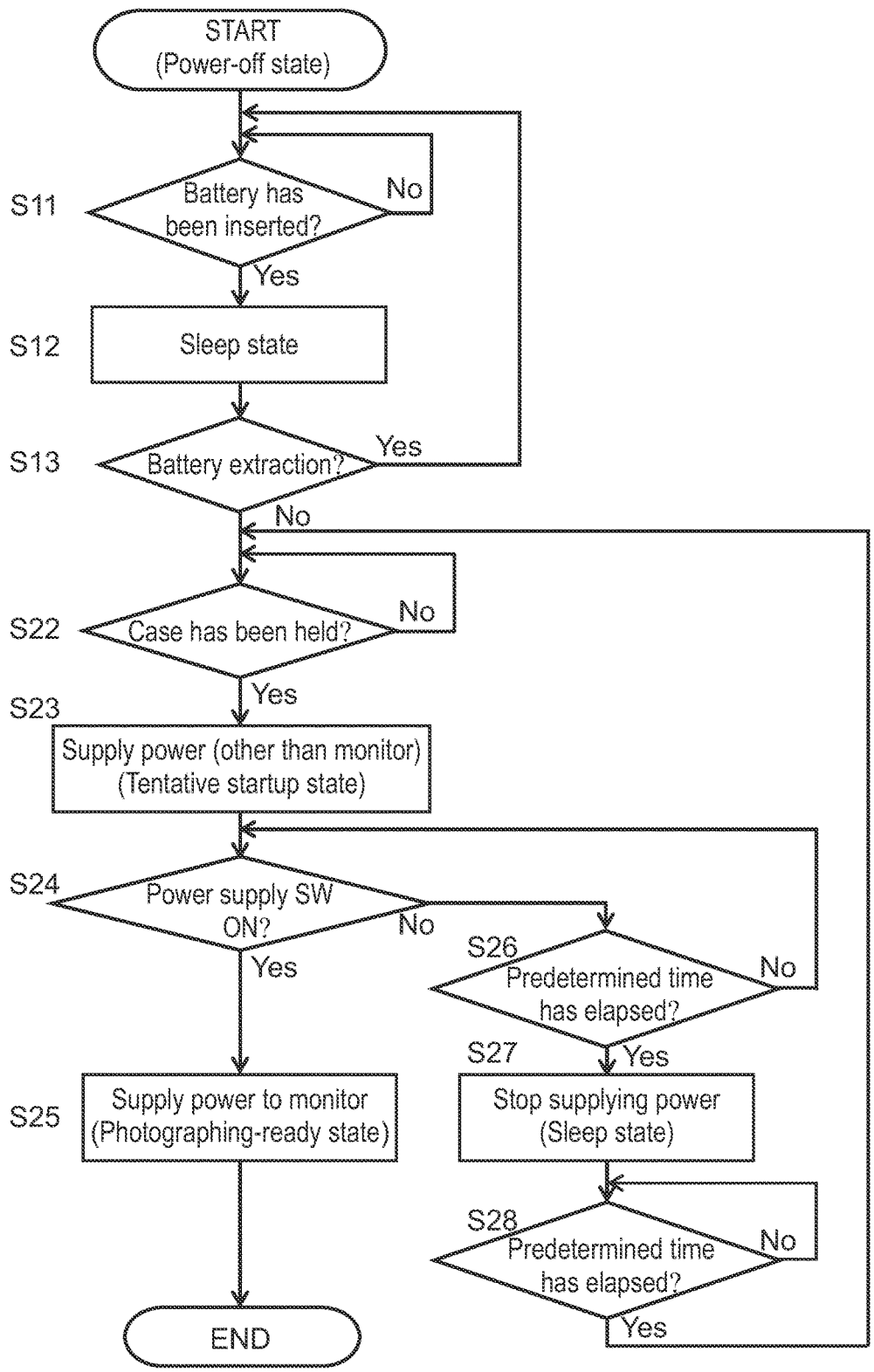
FIG. 5B is a flowchart of the process at startup of the digital camera of the first embodiment.

Next, a description is made of the startup operation of digital camera 100 according to the embodiment using FIGS. 5A and 5B. FIG. 5A illustrates state transition at startup of digital camera 100 of the first embodiment. Digital camera 100 has a tentative startup state in addition to the power-off state, sleep state, and photographing-ready state in the existing digital camera shown in FIG. 4.

The power-off state and the sleep state are the same as those of the existing digital camera described above. The tentative startup state is a state in which power is being supplied to the imaging system composed of the electrical components (other than LCD monitor 123 of digital camera 100) required for photographing. In this embodiment, the imaging system includes lens barrel 200, CMOS image sensor 120, AFE 121, and image processing unit 122, all of which are supplied with power, where power may be supplied to some of them. The photographing-ready state is a state in which power is being supplied to the electrical components required for photographing by digital camera 100, including LCD monitor 123 of digital camera 100, and thus the camera is ready for photographing.

FIG. 5B is a flowchart of the process at startup of digital camera 100 according to the first exemplary embodiment. In digital camera 100 as well, the operation for detecting the insertion and extraction of battery 300 is the same as that of an existing digital camera (steps S11 through S13). Next, when digital camera 100 detects using pressure-sensitive detection sensor 210 that case 101 has been held (step S22), the camera supplies power to the electrical components other than LCD monitor 123 of digital camera 100 (step S23). Next, when digital camera 100 detects that the user has turned on power switch 203 (Yes in step S24), the camera supplies power to LCD monitor 123 as well (step S25), and the camera transitions to the photographing-ready state.

Further, after digital camera 100 starts to supply power to the electrical components other than LCD monitor 123 (step S23), the camera continues to detect whether or not power switch 203 of digital camera 100 is turned on by the user for a predetermined time (the first time period) (steps S24 and S26). When the predetermined time (the first time period) elapses (Yes in step S26) without digital camera 100 detecting turning on of power switch 203 (No in step S24), the camera stops supplying power to the imaging system and returns to the sleep state (step S27). Then digital camera 100, after waiting for a predetermined time (the second time period) (No in step S28), returns to step S22 for detecting the case held (Yes in step S28).

Here, step S28 for monitoring the elapse of a predetermined time (the second time period) is provided to avoid the following case. That is, while the user is holding the grip part (detection sensor 210) of case 101, even if supplying power is stopped in step S27, the process immediately proceeds to step S23 to make the process of step 27 substantially meaningless. Note that step S28 does not necessarily need to be provided.

In this way, compared to an existing digital camera, digital camera 100 transitions to the tentative startup state when detection sensor 210 detects that case 101 has been held, and thus when power switch 203 is turned on later, digital camera 100 can start up promptly, which reduces the startup time sensible to the user.

Meanwhile, digital camera 100 transitions to the sleep state after a predetermined time elapses from the tentative startup state. Then for a predetermined time, the camera does not transition to the tentative startup state even if the camera detects the case held by the user. In this way, if the user has no intention of photographing while continuing to hold case 101, digital camera 100 prevents power consumption caused by the tentative startup state maintained longer than necessary.

Hereinafter, a detailed description is made of behaviors about the tentative startup state of digital camera 100. In the tentative startup state, power is not being supplied to LCD monitor 123. Thus LCD monitor 123 does not display an image, which looks to the user as if the power were not on.

In the tentative startup state, digital camera 100 supplies power to CMOS image sensor 120, which allows digital camera 100 to perform AF, AE, and other operation in the background in the tentative startup state. Subsequently, when the user turns on power switch 203 of digital camera 100, the camera transitions to the photographing-ready state in a shorter time because initializing operation for AE and AF for example has been completed.

Further, digital camera 100 performs operation for initializing lens barrel 200 in the tentative startup state. Concretely, controller 130 acquires information on the lens and initializes the lens position, for example, through the communication unit for performing communications with lens control unit 105 in the tentative startup state. Later, when the user turns on power switch 203 of digital camera 100, the camera transitions to the photographing-ready state in a shorter time because initializing of lens barrel 200 has been completed.

1-3 Advantages

Digital camera 100 according to the first exemplary embodiment described above, when detecting that case 101 has been held, enters the tentative startup state in which power is supplied to the electrical components other than LCD monitor 123, and when the user turns on the power, supplies power to LCD monitor 123. This configuration provides a digital camera that reduces the startup time sensible to the user. Digital camera 100 in the tentative startup state performs processes required for preparing photographing. This configuration allows the camera to transition to the photographing-ready state after the user turns on power switch 203 in a shorter time.

2. Second Exemplary Embodiment 2-1 Configuration

The configuration of digital camera 100 is assumed to be the same as that of the first exemplary embodiment, and detailed description is omitted.

2-2 Operation 2-2-1 Startup Operation of the Digital Camera

Figure 6A:
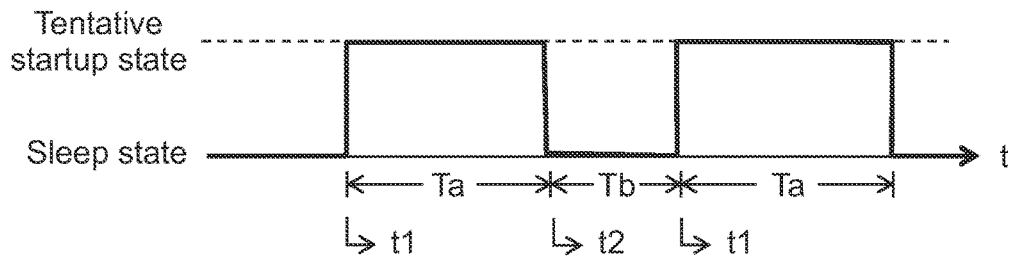
FIG. 6A is a timing diagram of the state at startup of a digital camera according to the second exemplary embodiment.
Figure 6B:
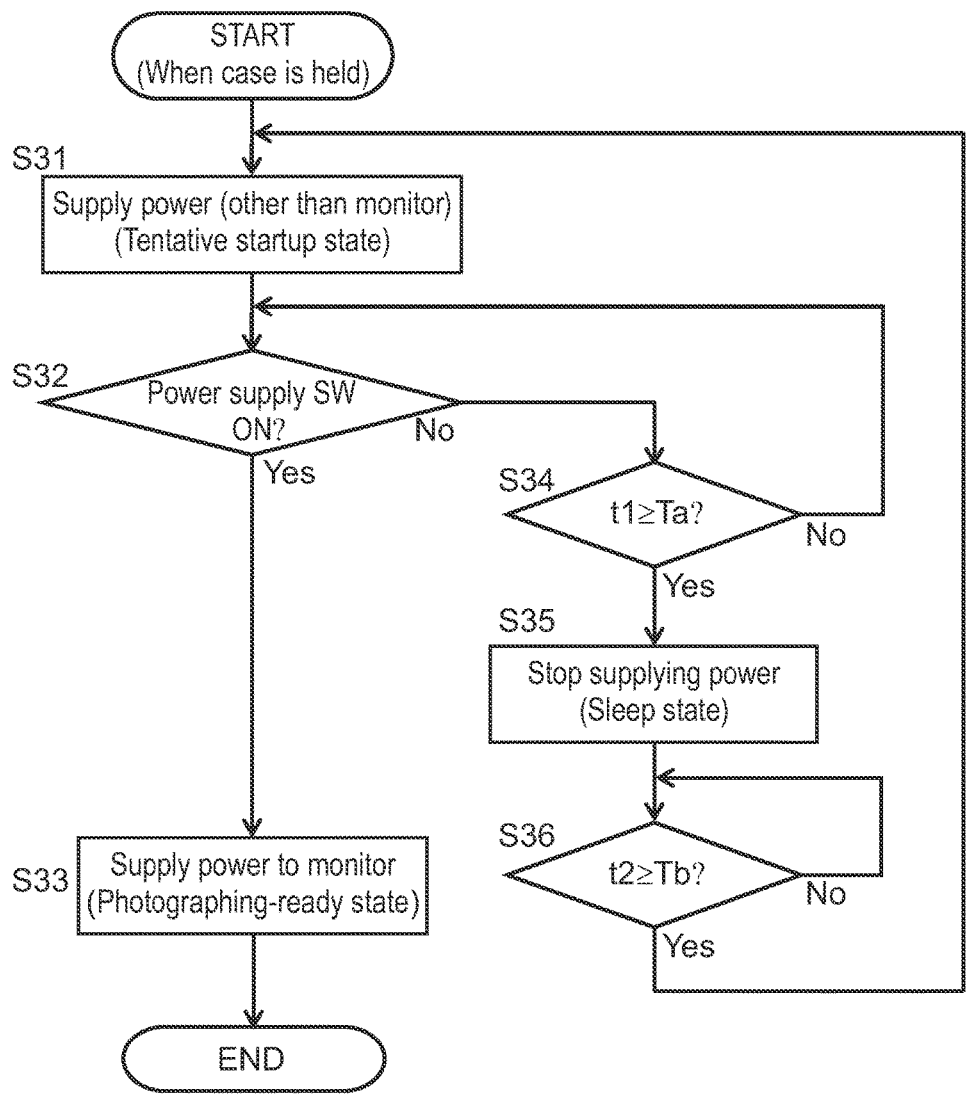
FIG. 6B is a flowchart of the process at startup of the digital camera of the second embodiment.

Next, a description is made of startup operation of digital camera 100 according to the second exemplary embodiment using FIGS. 6A and 6B. The second embodiment represents operation performed when digital camera 100 is being held by the user. The state transition at startup of digital camera 100 of the second embodiment is the same as that in the first embodiment shown in FIG. 5A.

FIG. 6A is a timing diagram of the state transition while digital camera 100 continues detecting that case 101 is being held, using pressure-sensitive detection sensor 210. In FIG. 6A, elapsed time t1 represents elapsed time after digital camera 100 has entered the tentative startup state. Elapsed time t2 represents elapsed time after digital camera 100 has entered the sleep state. Time Ta represents time during which digital camera 100 is in the tentative startup state. Time Tb represents time during which digital camera 100 is in the sleep state. FIG. 6A shows that digital camera 100 is in the tentative startup state for predetermined time Ta and in the sleep state for predetermined time Tb. FIG. 6A further shows that digital camera 100 repeats the tentative startup state for time Ta and the sleep state for time Tb alternately.

FIG. 6B is a flowchart of the process when digital camera 100 is repeating the intermittent operation shown in FIG. 6A. Digital camera 100 is in the tentative startup state while continuing to detect using pressure-sensitive detection sensor 210 that the user is holding case 101, and supplies power to the electrical components other than LCD monitor 123 (step S31). Subsequently, digital camera 100 continues to monitor for predetermined time Ta whether or not power switch 203 of digital camera 100 has been turned on (steps S32 and S34).

In other words, digital camera 100 monitors whether or not elapsed time t1 has exceeded predetermined time Ta until the user turns on power switch 203 in the tentative startup state (step S34). Digital camera 100, when detecting that power switch 203 has been turned on during predetermined time Ta (No in step S34, Yes in step S32), supplies power to LCD monitor 123 of digital camera 100 as well (step S33) and transitions to the photographing-ready state.

Digital camera 100, unless detecting that power switch 203 has been turned on during predetermined time Ta (Yes in step S34), continues supplying power to buffer memory 124 and controller 130, stops supplying power to the other electrical components (step S35), and transitions to the sleep state.

Digital camera 100 monitors whether or not elapsed time t2 has exceeded predetermined time Tb in the sleep state (step S36). Digital camera 100, when predetermined time Tb elapses in the sleep state, returns to step S31 again. In this case, case 101 is being held by the user and detection sensor 210 is on, and thus power is supplied to the electrical components other than LCD monitor 123, transitioning to the tentative startup state. Then, digital camera 100 continues monitoring whether or not power switch 203 has been turned on by the user (step S32).

In this way, digital camera 100 switches supplying power to the electrical components other than LCD monitor 123 in a predetermined cycle and repeats the tentative startup state and the sleep state in a predetermined cycle, thereby reducing the startup time sensible to the user while suppressing consumption of battery 300.

Note that predetermined time Ta is preferably set longer than predetermined time Tb. This is because longer time Ta (the tentative startup state) further reduces the startup time sensible to the user.

3. Third Exemplary Embodiment 3-1 Configuration

Figure 7:
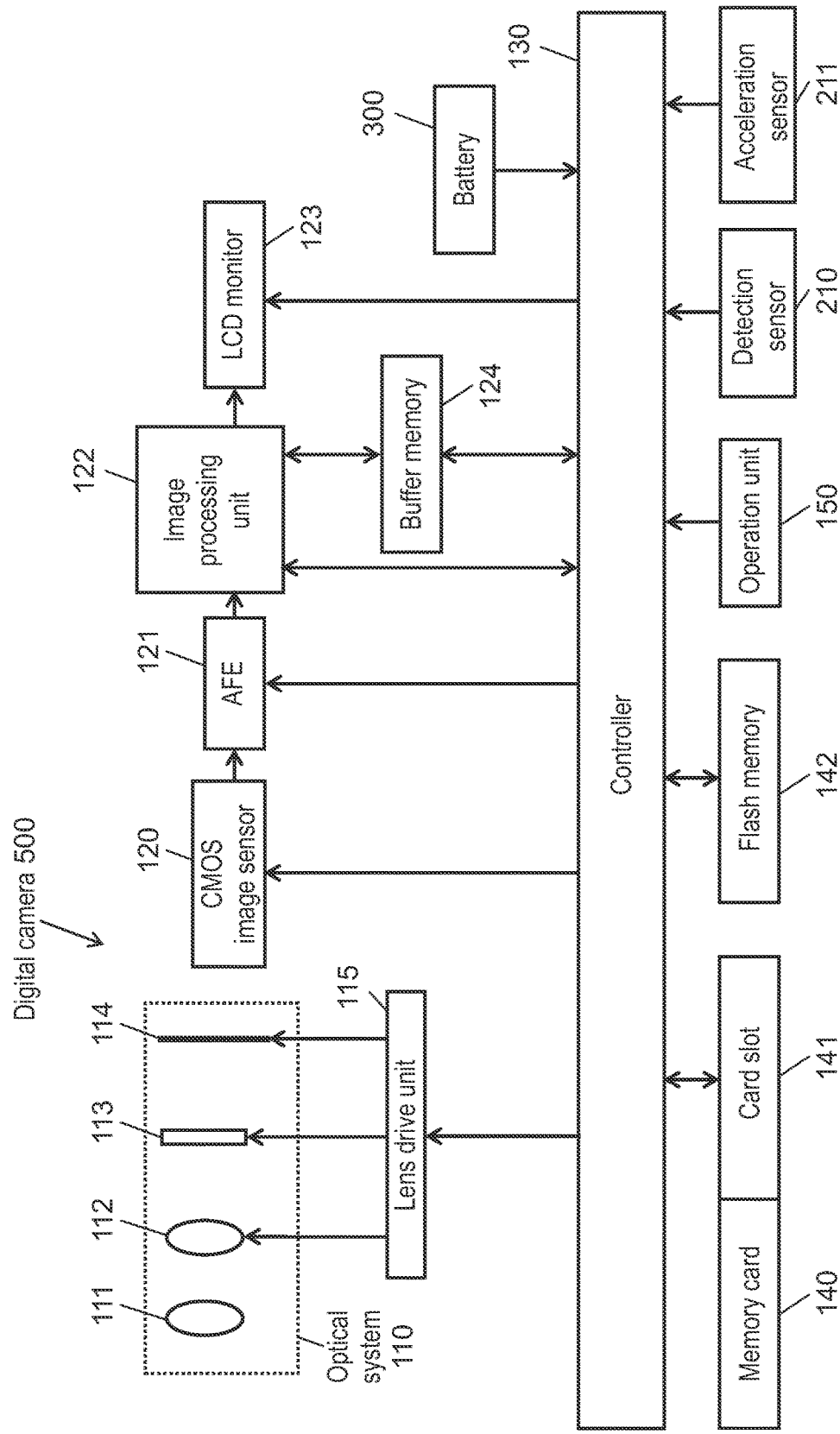
FIG. 7 is an electrical block diagram of a digital camera according to the third exemplary embodiment.

FIG. 7 is an electrical block diagram of digital camera 500 according to the third exemplary embodiment. The front view and the rear view of digital camera 500 are the same as those of digital camera 100 shown in FIGS. 1 and 2, and thus their descriptions are omitted. Digital camera 500 includes acceleration sensor 211 as the second detection means, additionally to the first exemplary embodiment. In digital camera 100 of the first embodiment, lens barrel 200 as an interchangeable lens is detachable from case 101. The lens barrel of digital camera 500, however, is not detachable. Accordingly, controller 130 of digital camera 500 directly controls lens drive unit 115. The other components are the same as those of the first embodiment, and thus their descriptions are omitted.

Acceleration sensor 211 is used for detecting acceleration of digital camera 500. An output signal (i.e., information on acceleration) from this acceleration sensor 211 is sent to controller 130. Controller 130 integrates the information on acceleration once or twice to convert it to information on velocity or position. Controller 130 performs various types of control such as camera-shake compensation according to information on velocity for example obtained from acceleration sensor 211.

3-2 Operation 3-2-1 Startup Operation of the Digital Camera

Figure 8A:
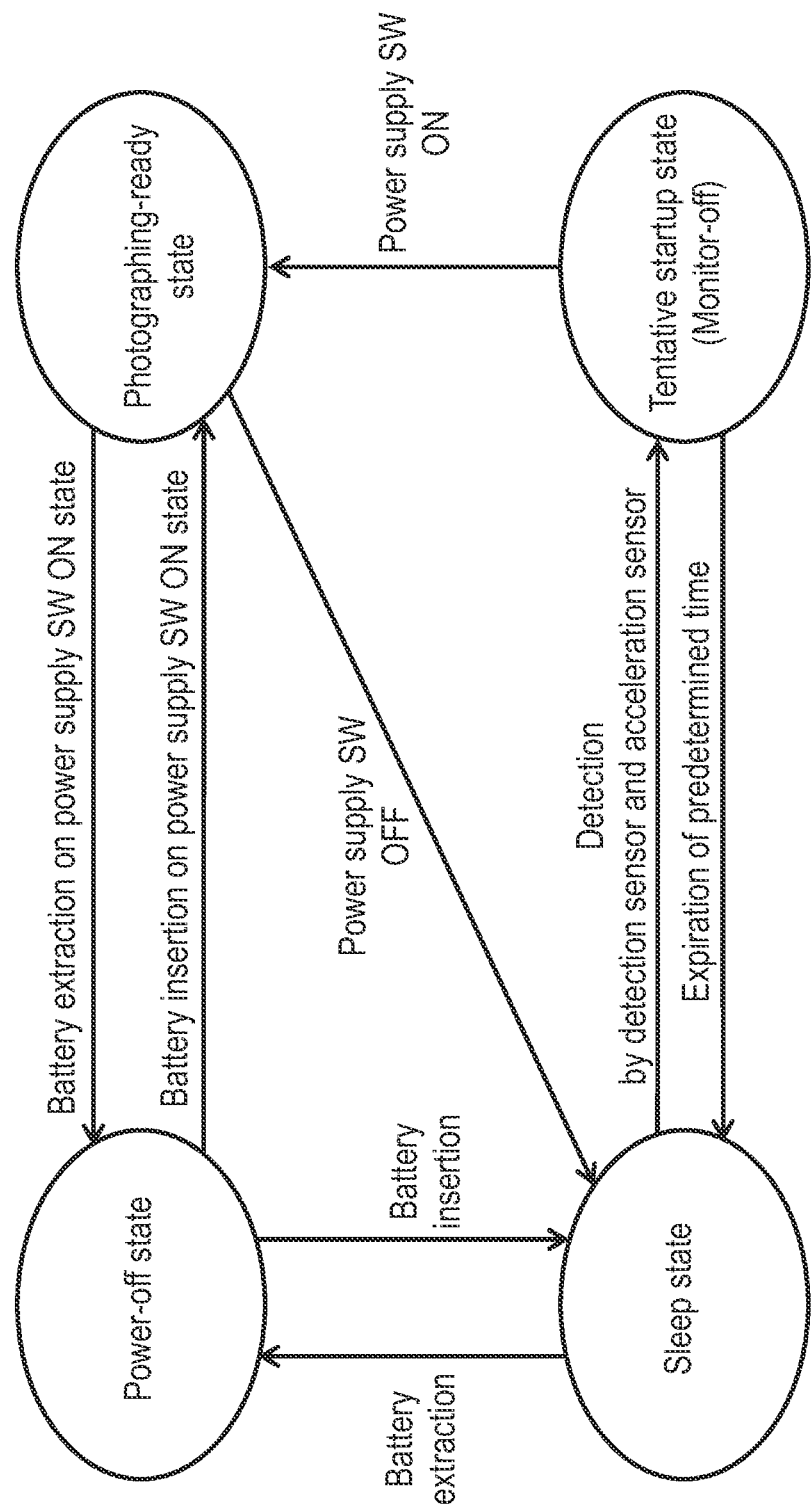
FIG. 8A illustrates state transition of the digital camera of the third embodiment.
Figure 8B:
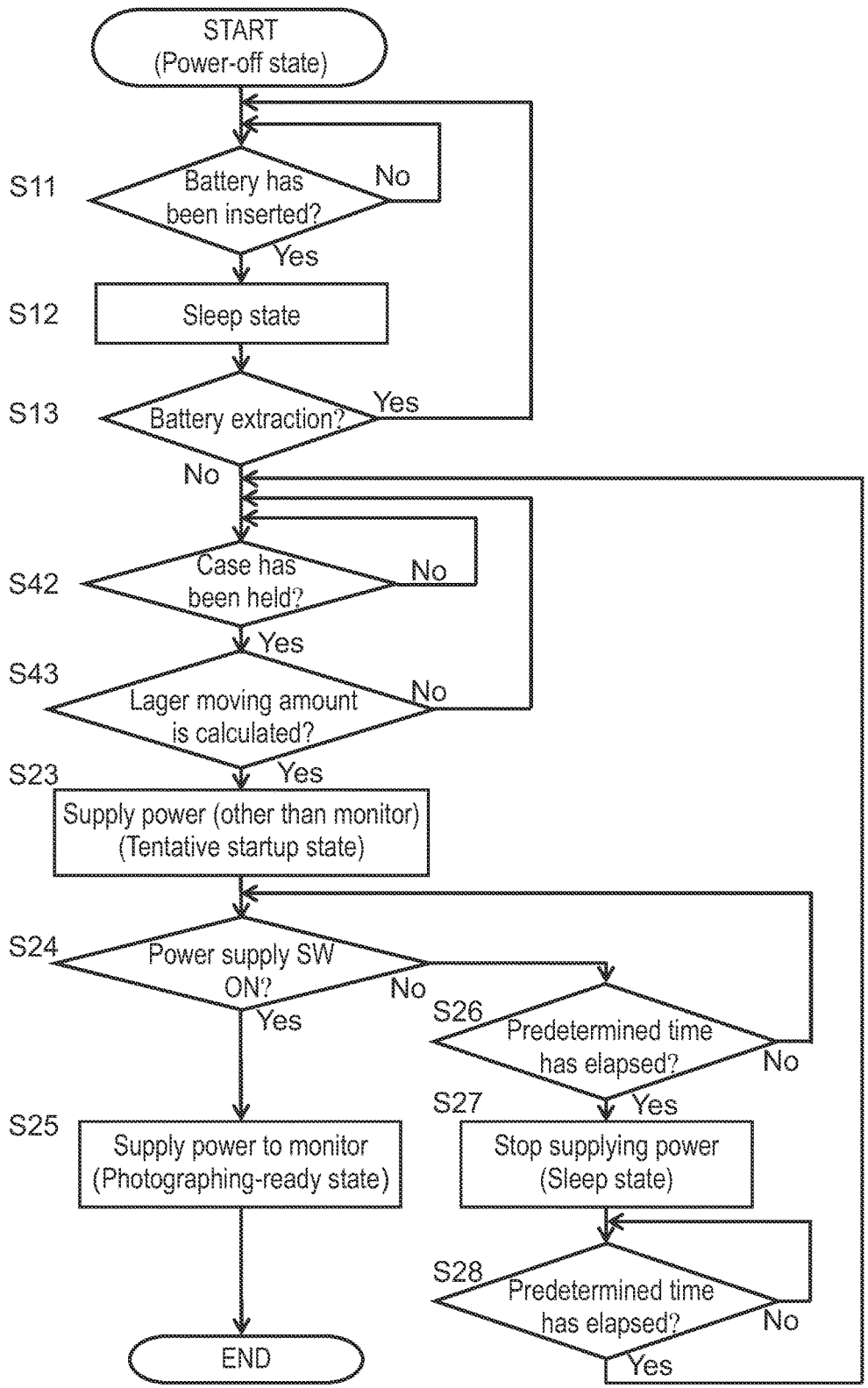
FIG. 8B is a flowchart of the process at startup of the digital camera of the third embodiment.

Next, a description is made of the startup operation of digital camera 500 according to the embodiment using FIGS. 8A and 8B. FIG. 8A illustrates state transition at startup of digital camera 500 of the third exemplary embodiment. Digital camera 500 has a power-off state, sleep state, tentative startup state, and photographing-ready state, as power supplying states in the same way as the first embodiment. Digital camera 500 transitions at startup from the sleep state to the tentative startup state according to detection results from both of the first detection means (detection sensor 210) and the second detection means (acceleration sensor 211), which is different from the first embodiment.

Next, FIG. 8B is a flowchart of the process at startup of digital camera 500 of the third embodiment. The flow of the process to detecting the insertion and extraction of battery 300 (steps S11 through S13) is the same as that of the first embodiment. Digital camera 500 of the third embodiment detects using pressure-sensitive detection sensor 210 that case 101 has been held (step S42), and at the same time calculates a moving amount of digital camera 500 from acceleration information detected by acceleration sensor 211. If the moving amount is equal to a predetermined value or larger (Yes in step S43), the process proceeds to step S23, and digital camera 500 supplies power to the imaging system that is composed of the electrical components other than LCD monitor 123, entering the tentative startup state. In this embodiment, the imaging system includes lens drive unit 115, CMOS image sensor 120, AFE 121, and image processing unit 122, all of which are supplied with power, where power may be supplied to some of them.

In this way, digital camera 500 includes a first detection means (detection sensor 210) and a second detection means (acceleration sensor 211) to prevent digital camera 500 from unintentionally transitioning to the tentative startup state. In other words, by using two detection means (i.e., detection sensor 210 and acceleration sensor 211), the camera more reliably detects that the user has entered the photographing state while reducing the startup time sensible to the user.

Note that this embodiment assumes that digital camera 500 transitions to the tentative startup state if the moving amount of case 101 detected by acceleration sensor 211 is equal to a predetermined value or larger, but the present disclosure is not limited to this case. Instead, digital camera 500 may determine that the attitude of the camera has become that for normal photographing based on acceleration detected by acceleration sensor 211 to transition to the tentative startup state.

4. Other Exemplary Embodiments

Hereinbefore, the first through third exemplary embodiments are described to exemplify the technology disclosed in this patent application. The technology of the disclosure, however, is not limited to these embodiments, but is applicable to other embodiments devised through modification, substitution, addition, omission for example. Further, some components described in the first through third exemplary embodiments can be combined to create a new embodiment.

The scope of the present disclosure is not limited to the above embodiments, but other different embodiments can be devised. Hereinafter, some other embodiments of the disclosure are described.

(1) In the first and second embodiments, the description is made of the example of pressure-sensitive detection sensor 210 as the first detection means of the digital camera, but the disclosure is not limited to this example. The first detection means may be an electrostatic touch-detection sensor provided to still image release button 201, or a sensor for detecting acceleration of the digital camera.

(2) In the first through third embodiments, power is not supplied only to LCD monitor 123 of the digital camera in the tentative startup state, but the disclosure is not limited to this example. The digital camera may supply power to LCD monitor 123 in the tentative startup state while turning off the output of a display image to LCD monitor 123 (display muting).

(3) In the first through third embodiments, acceleration sensor 211 is assumed to be used as the second detection means of the digital camera, but the disclosure is not limited to this case. The second detection means may be a pressure-sensitive detection sensor or an electrostatic touch-detection sensor provided to still image release button 201. Alternatively, the second detection means may be an eye sensor that detects that the user is looking through the viewfinder of the digital camera, or an electrostatic or pressure-sensitive touch panel provided to LCD monitor 123.

(4) In the first through third embodiments, the description is made of the example of battery 300 of the digital camera that can be inserted into and extracted from the digital camera, but the disclosure is not limited to this example. If the battery of the digital camera cannot be inserted into or extracted from the digital camera, the digital camera may transition between the sleep state, the tentative startup state, and the photographing-ready state, without the power-off state shown in FIG. 5A or 8A provided.

INDUSTRIAL APPLICABILITY

The present disclosure is applicable to an imaging apparatus such as a digital camera, movie device, and smartphone.

What is claimed is:

1. An imaging apparatus comprising:
   a case;
   an imaging system that captures an object image and generates image data;
   a displaying unit that displays the image data;
   a detection sensor that is provided to the case and detects that the case has been held by a user;
   a power supply unit that supplies power to the imaging system, the displaying unit, and the detection sensor; and
   a power supply operation unit that selects turning on or off of supplying power,
   wherein when (i) the power supply operation unit is turned off and (ii) the detection sensor detects that the case has been held by the user, the power supply unit enters a tentative startup state in which power is supplied to the imaging system and power is not supplied to the displaying unit, and
   wherein the power supply unit supplies power to the displaying unit when the power supply operation unit is turned on in the tentative startup state.

2. The imaging apparatus of claim 1, wherein the power supply unit stops supplying power to the imaging system when the power supply operation unit is not turned on during a first time period in the tentative startup state.

3. The imaging apparatus of claim 2, wherein the power supply unit enters the tentative startup state again when the detection sensor detects that the case has been held by the user after a second time period elapses after the first time period elapsed.

4. The imaging apparatus of claim 1, wherein the power supply unit switches supplying power to the imaging system between on and off in a predetermined cycle during a time period from when the detection sensor detects that the case has been held by the user until when the power supply operation unit is turned on.

5. The imaging apparatus of claim 1, further comprising an acceleration sensor that detects acceleration of the case, wherein the power supply unit enters the tentative startup state when the detection sensor detects that the case has been held by the user and additionally the acceleration sensor detects that the case has moved by a predetermined value or larger.

6. The imaging apparatus of claim 1, wherein the imaging system includes an interchangeable lens detachable from the case, and
   wherein the imaging apparatus further comprises a communication unit that performs communications between the case and the interchangeable lens, the communication unit performing communications required for photographing between the case and the interchangeable lens in the tentative startup state.

7. The imaging apparatus of claim 3, wherein the first time period is set to be longer than the second time period.

\* \* \* \* \*